(12) United States Patent
Kim

(10) Patent No.: US 7,935,438 B2
(45) Date of Patent: May 3, 2011

(54) SECONDARY BATTERY MODULE

(75) Inventor: Yong-Sam Kim, Suwon-si (KR)

(73) Assignee: Samsung SDI Co., Ltd., Gongse-dong, Giheung-gu, Yongin-si, Gyeonggi-do (KR)

(*) Notice: Subject to any disclaimer, the term of this patent is extended or adjusted under 35 U.S.C. 154(b) by 1739 days.

(21) Appl. No.: 11/116,450

(22) Filed: Apr. 28, 2005

(65) Prior Publication Data
US 2005/0250006 A1 Nov. 10, 2005

(30) Foreign Application Priority Data

May 4, 2004 (KR) .................... 10-2004-0031308

(51) Int. Cl.
H01M 2/24 (2006.01)
H01M 2/14 (2006.01)
H01M 10/00 (2006.01)

(52) U.S. Cl. .................... 429/160; 429/129; 429/159

(58) Field of Classification Search .................. 429/160, 429/129, 159
See application file for complete search history.

(56) References Cited

U.S. PATENT DOCUMENTS

| 4,117,969 | A | * | 10/1978 | Fukuba | .................... 228/140 |
| 5,154,646 | A | * | 10/1992 | Shoup | .................... 439/772 |
| 5,985,480 | A | * | 11/1999 | Sato et al. | .................... 429/65 |

FOREIGN PATENT DOCUMENTS

| JP | 09-219181 | * | 8/1997 |
| JP | 10-199497 | | 7/1998 |
| JP | 2001-229896 | | 8/2001 |
| JP | 2002-246074 | * | 8/2002 |
| JP | 2002-260745 | | 9/2002 |

* cited by examiner

*Primary Examiner* — Dah-Wei Yuan
*Assistant Examiner* — Angela J. Martin
(74) *Attorney, Agent, or Firm* — Robert E. Bushnell, Esq.

(57) ABSTRACT

A large-capacity battery module which is formed by integrating a plurality of unit cells. The present invention provides a secondary battery module having a plurality of unit cells and connectors for electrically connecting the unit cells, which includes: a spacer set up between the unit cells and the connectors. The secondary battery module can insulate a cap from a connector and maintain a uniform space between the unit cells.

19 Claims, 4 Drawing Sheets

SECONDARY BATTERY MODULE

CLAIM OF PRIORITY

This application makes reference to, incorporates the same herein, and claims all benefits accruing under 35 U.S.C. §119 from an application for SECONDARY BATTERY MODULE earlier filed in the Korean Intellectual Property Office on 4 May 2004 and there duly assigned Serial No. 10-2004-0031308.

BACKGROUND OF THE INVENTION

1. Field of the Invention

The present invention relates to a secondary battery. More particularly, it relates to a high-voltage secondary battery module having a large capacity with improved unit cell connection.

2. Related Art

Recently, a high-voltage secondary battery using a high energy-density non-aqueous electrolyte is under development. A plurality of high-voltage secondary cells, which will be referred to as unit cells for the sake of convenience hereinafter, are connected in series to thereby form one module to be used for a device that requires high voltage, such as electric vehicle.

Conventionally, each of the unit cells includes an electrode assembly having a positive electrode and a negative electrode with a separator between them; a case having a space for housing the electrode assembly; a cap assembly joined with the case to seal the case; and terminals including a positive terminal and a negative terminal which protrude from the cap assembly to be electrically connected to the positive electrode and the negative electrode of the electrode assembly.

In order to integrate the unit cells into a module, the unit cells are arranged in such a manner that the positive terminal and the negative terminal of each unit cell are alternated with the positive terminal and the negative terminal of neighboring unit cells, and the terminals should be connected to each other by using conductive connectors.

Herein, the conductive connectors are penetrated by the terminals and fixed firmly by nuts so that they do not come out of the terminals. For the firm connection, a screw thread is formed in the external circumference of each terminal.

As described above, the conventional secondary battery module is formed by electrically connecting several to tens of unit cells by using the conductive connectors in the screw engagement method.

In the conventional secondary battery module, only when heat generated in each unit cell is emitted easily, the unit cells can be operated ideally and used smoothly in a device that is operated upon electric power from the battery module, e.g., a hybrid electric vehicle (HEV). Therefore, it can be said that heat emission is the most important factor in the secondary battery module applied to a high-voltage device.

To sum up, if heat is not emitted properly from the unit cells of the secondary battery module, the temperature of the battery module is raised as well as the temperature of each unit cell itself, and this leads to malfunction of the high-voltage device.

Therefore, when the secondary battery module is designed, required is a structure that can increase the heat emitting efficiency in each unit cell. For this, the unit cells need to be arranged with a uniform space between them.

In addition, when the secondary battery module is designed, the cap assembly of each unit cell needs be insulated from the conductive connector in the connection of the unit cells.

If the cap assembly and the conductive connector are not insulated properly, electric short occurs between them, thus degrading the performance of the entire battery module as well as the unit cell of the problem and causing malfunction.

However, the known secondary battery modules fail to maintain a uniform space between the unit cells. Moreover, since the spacing between the unit cells and the insulation between the cap assembly and the conductive conductor are achieved by using different parts individually, the entire structure and assembling process of the secondary battery module is complicated. In particular, since a secondary battery module for driving a motor of a hybrid electric vehicle has dozens of unit cells, when the above problems occur, the damage is even greater.

SUMMARY OF THE INVENTION

It is therefore an aspect of the present invention to solve the problems described above.

It is also an aspect of the present invention to provide an improved secondary battery module.

It is further an aspect of the present invention to provide a secondary battery module that can insulate a cap assembly from a connector which connects unit cells and maintain a uniform space between the unit cells with one structure, when a large-capacity battery module is formed by connecting a plurality of unit cells to form a large-capacity battery module.

To achieve the aspect, the present invention provides a secondary battery module having a plurality of unit cells; connectors electrically connecting neighboring unit cells, and a spacer positioned between the unit cells and the connectors.

Herein, the secondary battery module can be used for driving a motor. The unit cells include an electrode assembly having a positive electrode, a negative electrode, a separator between them; a case housing the electrode assembly; a cap assembly joined with the case to seal the case; and terminals including a positive terminal and a negative terminal which are electrically connected to current collectors of the positive electrode and the negative electrode and formed to be protruded from the cap assembly to the outside.

The spacer is formed of an insulating material or it has a non-conductive property by being covered with an insulating material. Therefore, the spacer can be simply held between the cap assembly of the unit cell and the conductive connector, and prevent the metallic cap assembly from being electrically connected to the conductive connector.

In addition, the spacer of the present invention is extended into a space between the arranged unit cells at a predetermined distance to thereby maintain a space between the unit cells.

Also, the spacer is set up to be penetrated by the terminals of the unit cells. Preferably, the spacer is formed in a shape of a bar extended in a length corresponding to the battery module and has spacer openings in the entire surface. The spacer openings are penetrated by the terminals of each unit cell.

Also, the spacer can further include insertion grooves in the lower part, and the cases of the unit cells are inserted into the insertion grooves.

Therefore, when the spacer is set up in the unit cells, the spacer insulates the cap assembly from the conductive connectors put on the cap assembly and set up in the terminals and maintains a uniform space between the cases, as the cases of the unit cells are inserted into the insertion grooves formed in the lower part of the spacer.

The battery module has terminal rows that are formed as the terminals are lined up according to the arrangement of the unit cells. The spacer is set up in each terminal row or the spacers set up in the terminal rows are connected and integrated into a body.

The spacer is penetrated by the positive and negative terminals protruded through the spacer openings and firmly fixed by using the conductive connectors put on the spacer and the nuts engaged with the positive and negative terminals.

To achieve the aspects, the present invention provides a secondary battery module comprising: a plurality of unit cells, each unit cell comprising an electrode assembly having a positive electrode, a negative electrode, and a separator between the positive electrode and the negative electrode; a case housing the electrode assembly; a cap assembly joined with the case to seal the case; and terminals including a positive terminal and a negative terminal which are electrically connected to the positive electrode and the negative electrode, the terminals protruded from the cap assembly, the terminals arrayed to alternate polarities of the terminals; an insulating spacer having spacer openings to be penetrated by the terminals and insertion grooves into which the cases of the unit cells are inserted in one side, the insulating spacer being put on the unit cells; connectors positioned on the spacer and penetrated by the terminals protruded through the spacer openings; and nuts firmly fixing the connectors by being engaged with the terminals.

To achieve the aspects, the present invention provides a secondary battery module, comprising: a plurality of unit cells, each of the plurality of unit cells comprising an electrode assembly having a positive electrode, a negative electrode and a separator positioned between the positive electrode and the negative electrode, a case housing the electrode assembly, a cap assembly joined with the case to seal the case, and terminals including a positive terminal and a negative terminal which are electrically connected to the positive electrode and the negative electrode protruded from the cap assembly; a spacer having spacer openings to be penetrated by the terminals and insertion grooves into which the cases of the unit cells are inserted in one side; and connectors positioned on the spacer to connect two adjacent terminals penetrated through the spacer openings.

BRIEF DESCRIPTION OF THE DRAWINGS

A more complete appreciation of the present invention, and many of the above and other features and advantages of the present invention, will be readily apparent as the same becomes better understood by reference to the following detailed description when considered in conjunction with the accompanying drawings in which like reference symbols indicate the same or similar components, wherein.

DETAILED DESCRIPTION OF THE PREFERRED EMBODIMENTS

In the following detailed description, the following embodiments of the invention have been shown and described, simply by way of illustration of the best mode contemplated by the inventors of carrying out the invention. As will be realized, the invention is capable of modification in various respects, all without departing from the invention. Accordingly, the drawings and description are to be regarded as illustrative in nature, and not restrictive.

Figure 1:
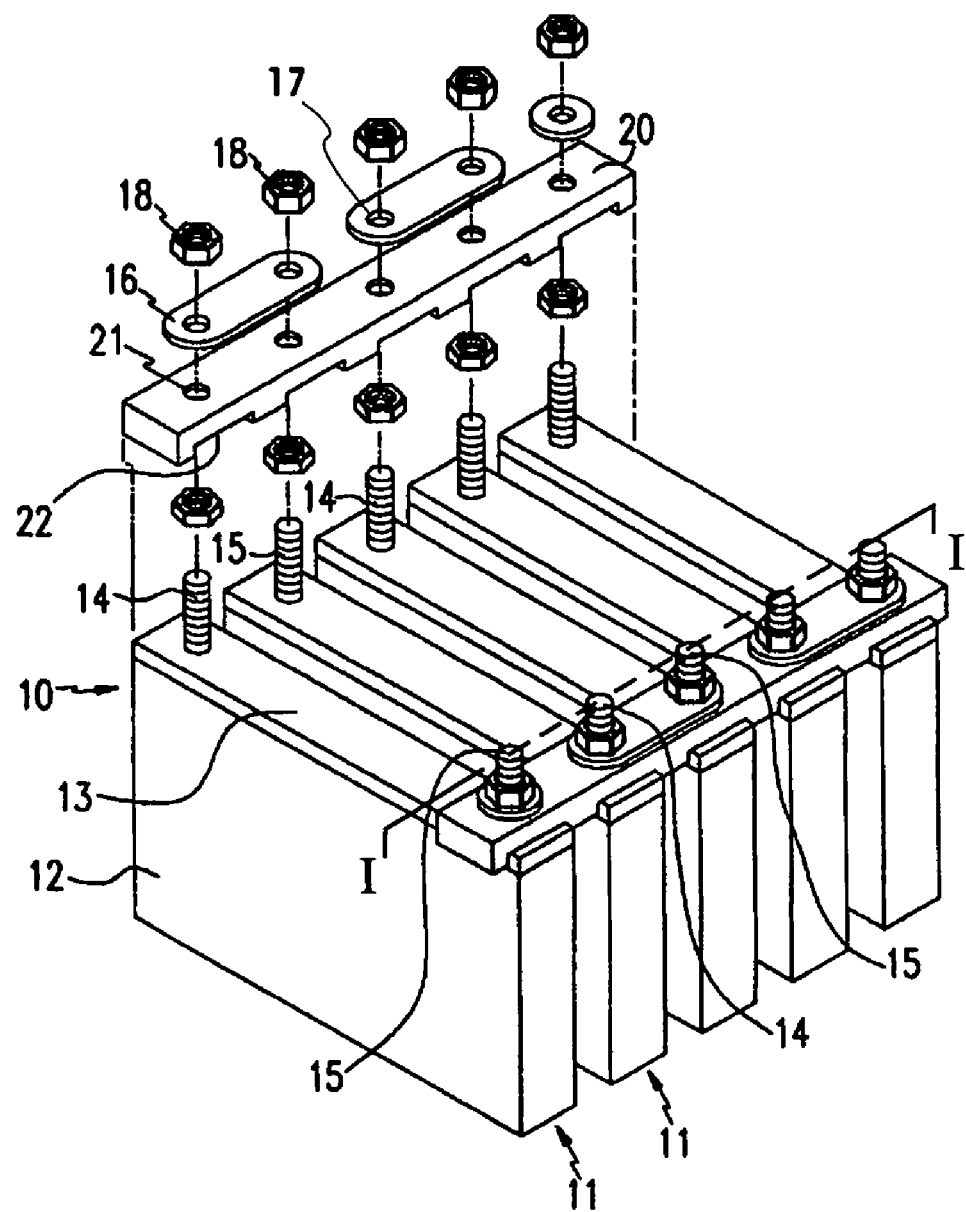
FIG. 1 is an exploded perspective view describing a secondary battery module in accordance with an embodiment of the present invention.
Figure 2:
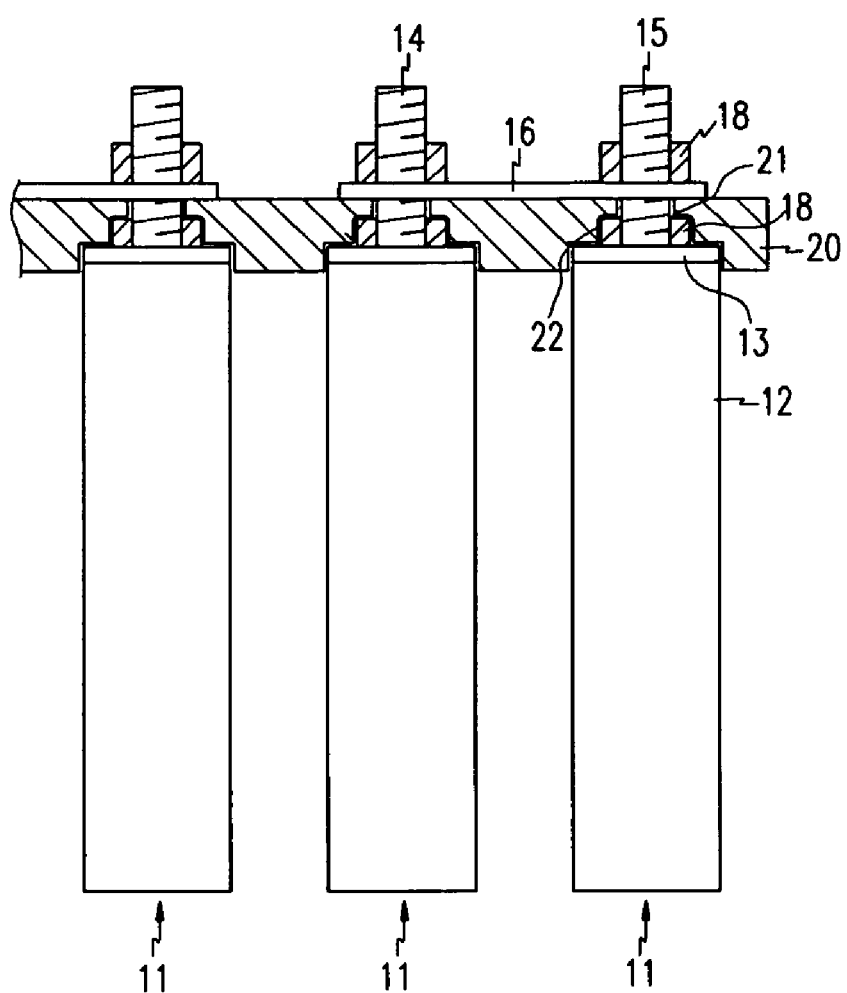
FIG. 2 is a cross-sectional view taken along the line 1-1 of FIG. 1.
Figure 3:
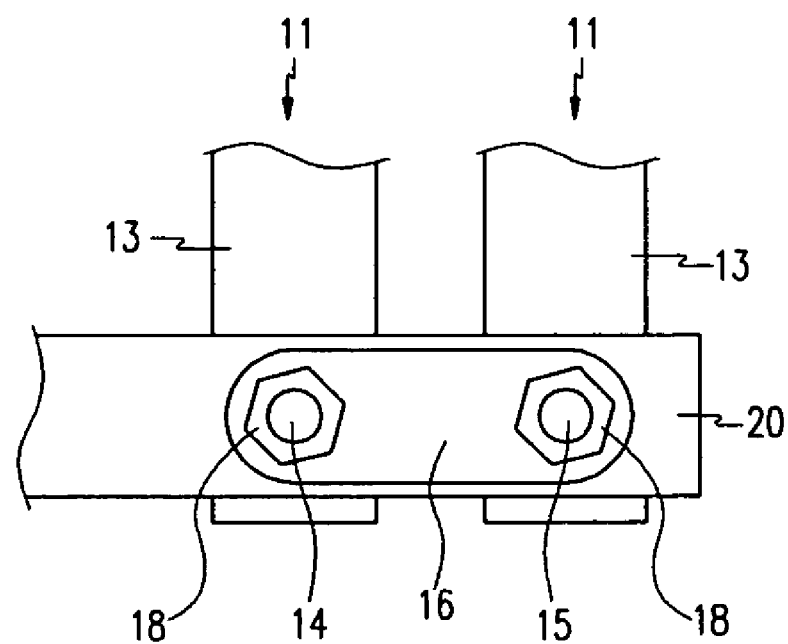
FIG. 3 is a plane view showing part of the secondary battery module in accordance with the embodiment of the present invention.

FIG. 1 is an exploded perspective view describing a secondary battery module in accordance with an embodiment of the present invention, and FIG. 2 is a cross-sectional view illustrating part of the secondary battery module in accordance with the embodiment of the present invention, while FIG. 3 is a plane view showing part of the secondary battery module in accordance with the embodiment of the present invention.

Unit cells 11 which form a large-capacity battery module 10 comprise an electrode assembly (not shown) having a positive electrode and a negative electrode with a separator between them, a case 12 having a space for housing the electrode assembly, a cap assembly 13 connected to the case 12 to seal the case, and terminals including a positive terminal 14 and a negative terminals 15 which are electrically connected to current collectors of the positive electrode and the negative electrode and protruded from the cap assembly 13 to the outside.

The case 12 is formed of a conductive metal, such as aluminum, aluminum alloy, and nickel-plated steel, and the case 12 has a shape having an internal space for housing the electrode assembly. The case has preferably a hexahedron shape.

In the present embodiment, each unit cell 11 has two terminals, i.e., the positive terminal and the negative terminal which are protruded from the cap assembly 13 with a space between them. Each terminal 14 or 15 has preferably a structure with a screw thread in the external circumferential surface To form a large-capacity battery module 10, the unit cells 11 having the above-mentioned structure are arrayed with the terminals 14 and 15 in the upper surface, and the positive terminal 14 and the negative terminal 15 protruded from the upper part of the cap assembly 13 of a unit cell 11 are arranged to be alternated with the positive terminal 14 and the negative terminal 15 of neighboring unit cells 11.

Consequently, terminal rows with alternating positive and negative terminals at a predetermined distance are formed on both sides of the unit cells. The terminal rows can be understood as lines that are formed by placing terminals with alternating polarity in rows.

The battery module 10 includes connectors 16 for electrically connecting the negative terminal and the positive terminal of a unit cell with the positive terminal 14 and the negative terminal 15, respectively, of the neighboring unit cells 11 to thereby connect the unit cells in series.

The connector 16 is preferably a plate having openings 17 on both ends, and the terminals 14 and 15 are held by the connector 16 through the openings 17. The connector 16 is fixed firmly by nuts 18 engaged with the terminals protruded through the openings 17 of the connectors 16.

Therefore, the positive terminal 14 of a first unit cell 11 is connected with the negative terminal 15 of a second unit cell 11 that comes after the first unit cell 11 via the connector 16, and then the positive terminal in the other terminal row of the second unit cell 11 is connected with the negative terminal of a third unit cell 11 that comes after the second unit cell 11 via the connector 16. This way, the entire unit cells 11 are connected serially.

Herein, the secondary battery module of the present invention further includes a spacer 20 between the cap assembly 13 of the unit cell and the connectors 16 set up in the terminals 14 and 15 in the battery module 10 of the above-described structure. The spacer 20 has a shape of a bar extended along a terminal row of the unit cells 11.

The spacer 20 has spacer openings 21 which are formed in a row and spaced apart from each other and penetrated by the terminals of the unit cells 11, and the spacer 20 includes insertion grooves 22 into which the case 12 of each unit cell 11 is inserted.

Preferably, the width of the insertion grooves 22 is approximately the same as that of the case 12 of each unit cell 22 so that the case 12 inserted into an insertion groove 22 is not moved in the insertion groove 22.

In the present embodiment, two pieces of the spacers 22 are provided to be set upon the two terminal rows of the unit cells 11.

Accordingly, when the spacer openings 21 formed in the spacers 20 are brought to the terminals of the arranged unit cells, and the spacers 20 are penetrated by the terminals through the spacer openings 21 before the setup of the connectors 16 in the process of assembling the battery module 10, the spacers 20 come to be put on the cap assembly 13. Since the non-conductive spacers 20 which are formed of an insulating material are positioned between the cap assembly 13 of each unit cell 11 and the connector 16, the metallic cap assembly 13 and the metallic connector 16 are electrically disconnected.

When the spacers 20 are connected with the unit cells 11, the cases 12 of the unit cells 11 are inserted into the insertion grooves 22 formed in the lower part of the spacers 20. Thus, the space between the unit cells 11 is maintained uniformly according to the space between the insertion grooves 22 of the spacers 20.

Herein, the insertion grooves 22 are formed in the spacer 20 at places corresponding to the spacer openings 21. Therefore, when the spacer 20 is engaged with the terminals of a unit cell 11 through the spacer openings 21, the case 12 of the unit cell 11 with the terminals set up therein is inserted into the insertion groove 22 of the spacer 20.

When the spacer 20 is connected with the unit cells 11, the connectors 16 are set up on the terminals protruded through the spacer openings 21 in accordance with the arrangement of the terminal polarities.

When the openings 17 formed in both ends of the connector 16 are connected with the positive terminal and the negative terminal of neighboring unit cells 11, the connector 16 comes to be put on the spacer 20. In this state, the connector is fixed onto the spacer 20 by the nuts engaged with and fastened into the two terminals protruded through the openings 17 of the connector 16, and thus the unit cells 11 are connected with each other in series.

As described above, the connector 16 can be insulated from the cap assembly 13 of the unit cells 11 simply by engaging the spacer 20 with the terminals, and a predetermined space can be maintained between the unit cells 11 that form the battery module 10.

Figure 4:
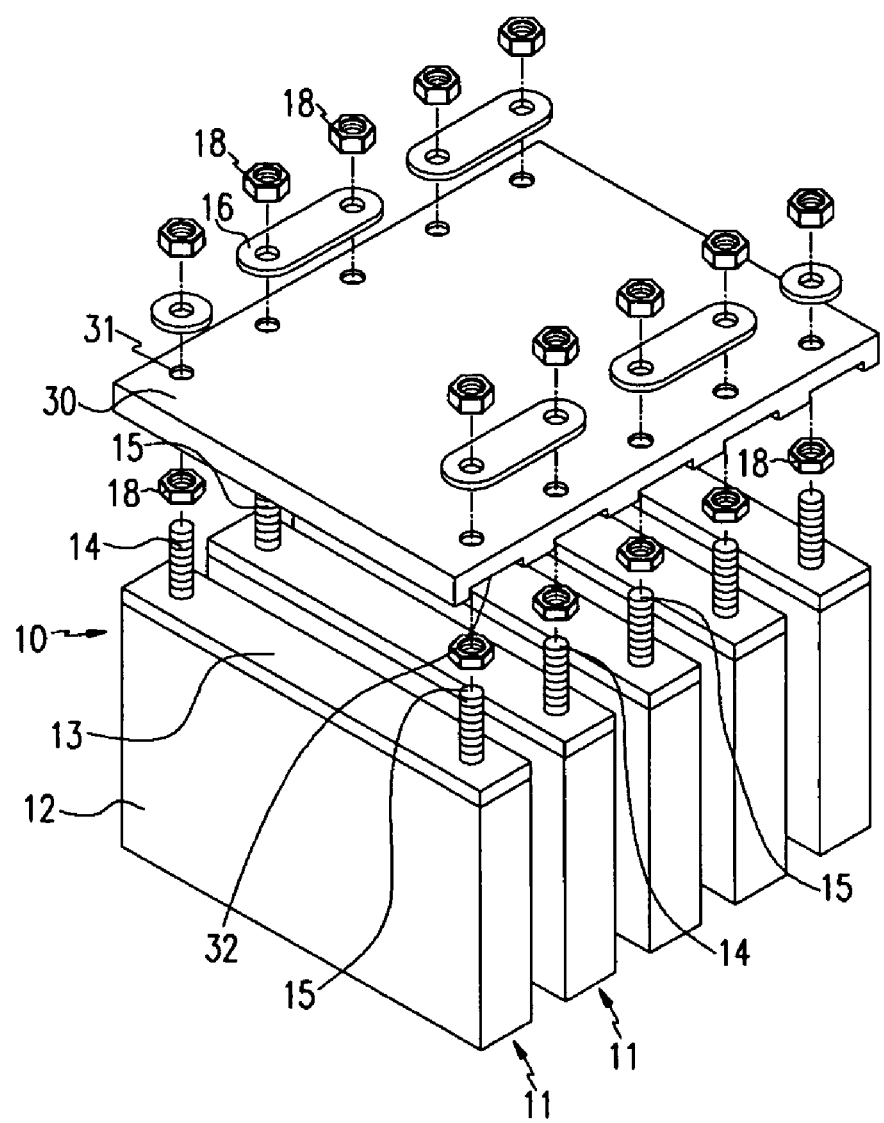
FIG. 4 is an exploded perspective view describing a secondary battery module in accordance with another embodiment of the present invention.

Meanwhile, FIG. 4 presents another embodiment of the present invention, in which a spacer 30 covers the entire unit cells 11.

In this embodiment, a secondary battery module has the spacer 30 which is set up between the cap assemblies 13 of the unit cells 11 and the connectors 16 to be set up on the terminals. The spacer 30 has a structure of a plate that covers all the two terminal rows that are formed by the arrangement of the unit cells 11. The entire surface of the spacer 30 has spacer openings 31, which are to be engaged with the terminals 14 and 15 of the terminal rows, with a predetermined space, and the spacer 30 has insertion grooves 22 where the cases 12 of the unit cells 11 are inserted in the lower part.

Since the entire unit cells 11 are covered by a piece of spacer 30, the cap assemblies 13 of the entire battery module 10 can be insulated from the connectors 16 by the spacer 30 with the spacer 30. In addition, the insertion of the cases 12 of the unit cells 11 into the insertion grooves 32 makes the unit cells 11 maintain a uniform space between them.

The plate-type spacer 30, just as the first embodiment, is engaged with and fixed firmly on the terminals protruded through the spacer openings 31 of the spacer 30 by putting on the connectors 16 and fastening the nuts 18.

In accordance with the present invention, the present invention can insulate the connectors for connecting the cells electrically from the cap assemblies of the cells in a simple manner and maintain a uniform space between the cells.

Therefore, the present invention can prevent electric short between the terminals and a cap and enhance a heat emitting efficiency of the cells.

In addition, since the insulation function and the spacing function can be brought about by a part at once, the present invention has the effects of easy setup, reduced work process, and profit increase coming from reduction in parts.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A secondary battery module, comprising:
a plurality of unit cells;
connectors electrically connecting the plurality of unit cells, each connector having a side surface facing the unit cells; and
an electrically insulating spacer positioned between the unit cells and the connectors, the electrically insulating spacer contacting the entire side surface of each connector;
wherein the spacer is extended in a length corresponding to the battery module, the spacer has spacer openings through which the terminals of each unit cell penetrate, and the spacer openings are formed in the entire surface of the spacer and are spaced apart from each other.

2. The secondary battery module of claim 1, wherein each of the plurality of unit cells comprises an electrode assembly having a positive electrode, a negative electrode and a separator positioned between the positive electrode and the negative electrode, a case housing the electrode assembly, a cap assembly joined with the case to seal the case, and terminals including a positive terminal and a negative terminal which are electrically connected to the positive electrode and the negative electrode protruded from the cap assembly.

3. The secondary battery module of claim 2, wherein the spacer has a plurality of openings into which the positive terminals and the negative terminals of the unit cells are inserted.

4. The secondary battery module of claim 2, wherein the spacer is extended into a space between the cap assemblies of the neighboring unit cells.

5. The secondary battery module of claim 1, wherein the spacer has insertion grooves in one side, and the unit cells are inserted into the insertion grooves.

6. The secondary battery module of claim 1, wherein the spacer is set up on terminal rows formed according to arrangement of the unit cells.

7. The secondary battery module of claim 6, wherein the spacer is integrated into a single body.

8. The secondary battery module of claim 2, wherein the terminals of the plurality of the unit cells are lined up to form a first row and a second row, and the spacer comprises a first spacer and a second spacer mounted corresponding to the first row and the second row, respectively.

9. The secondary battery module of claim 1, wherein the spacer is formed of an electrically insulating material.

10. The secondary battery module of claim 1, wherein the spacer is covered with an electrically insulating material on its surface.

11. The secondary battery module of claim 1, which is connectable to operationally drive a motor.

12. A secondary battery module, comprising:
a plurality of unit cells, each of the plurality of unit cells comprising:
an electrode assembly having a positive electrode, a negative electrode, and a separator between the positive electrode and the negative electrode;
a case housing the electrode assembly;
a cap assembly joined with the case to seal the case; and
terminals including a positive terminal and a negative terminal which are electrically connected to the positive electrode and the negative electrode, the terminals protruded from the cap assembly, the terminals of the plurality of unit cells being disposed to have alternate electrical polarities;
an insulating spacer having spacer openings to be penetrated by the terminals and insertion grooves into which the cases of the unit cells are inserted in one side, the insulating spacer being put on the unit cells;
connectors positioned on the spacer and penetrated by the terminals protruded through the spacer openings; and
nuts firmly fixing the connectors by being engaged with the terminals.

13. A secondary battery module, comprising:
a plurality of unit cells, each of the plurality of unit cells comprising:
an electrode assembly having a positive electrode, a negative electrode and a separator positioned between the positive electrode and the negative electrode;
a case housing the electrode assembly;
a cap assembly joined with the case to seal the case; and
terminals including a positive terminal and a negative terminal which are electrically connected to the positive electrode and the negative electrode protruded from the cap assembly;
a spacer having spacer openings to be penetrated by the terminals and insertion grooves into which the cases of the unit cells are inserted in one side; and
connectors positioned on the spacer to connect two adjacent terminals penetrated through the spacer openings.

14. The secondary battery module of claim 13, wherein the spacer is made of an insulating material to insulate the cap assembly from the connectors.

15. The secondary battery module of claim 13, wherein the spacer is covered with an insulating material on its surface to insulate the cap assembly from the connectors.

16. The secondary battery module of claim 13, wherein the plurality of the unit cells forms a first row and a second row of the terminals, and the spacer comprises a first spacer and a second spacer mounted corresponding to the first row and the second row, respectively.

17. The secondary battery module of claim 16, wherein the first spacer and the second spacer have a shape of a bar extended along the first row and the second row of the terminals.

18. The secondary battery module of claim 13, wherein the plurality of the unit cells form a first row and a second row of the terminals, and the spacer is one single body to insulate the cap assemblies from the connectors.

19. The secondary battery module of claim 13, wherein each of the terminals has a screw thread in the external circumference of each terminal, and nuts are engaged with the terminals on which the spacer and the connectors are positioned.

* * * * *